(12) United States Patent
Lipkin et al.

(10) Patent No.: US 10,860,947 B2
(45) Date of Patent: Dec. 8, 2020

(54) VARIATIONS IN EXPERIMENT GRAPHS FOR MACHINE LEARNING

(71) Applicant: Microsoft Technology Licensing, LLC, Redmond, WA (US)

(72) Inventors: Lev Lipkin, Weston, MA (US); Ilya Matiach, Quincy, MA (US); Anthony Christopher Karloff, Watertown, MA (US); Chi Ken Cheng Tsui, Arlington, MA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 1208 days.

(21) Appl. No.: 14/972,760

(22) Filed: Dec. 17, 2015

(65) Prior Publication Data
US 2017/0178021 A1  Jun. 22, 2017

(51) Int. Cl.
  *G06N 20/00* (2019.01)
  *G06N 3/12* (2006.01)
  *G06F 16/901* (2019.01)
  *G06F 3/0481* (2013.01)

(52) U.S. Cl.
  CPC ......... *G06N 20/00* (2019.01); *G06F 16/9024* (2019.01); *G06N 3/126* (2013.01); *G06F 3/04817* (2013.01)

(58) Field of Classification Search
  CPC . G06N 99/005; G06N 3/126; G06F 17/30958
  See application file for complete search history.

(56) References Cited

U.S. PATENT DOCUMENTS

| | | | |
|---|---|---|---|
| 6,266,053 | B1 | 7/2001 | French |
| 6,397,191 | B1 * | 5/2002 | Notani ............ G06F 9/46 705/7.26 |
| 7,610,263 | B2 | 10/2009 | Detlinger et al. |
| 8,185,423 | B2 | 5/2012 | Brook et al. |
| 8,612,368 | B2 | 12/2013 | Burdick |
| 2005/0160397 | A1 | 7/2005 | Szpak et al. |
| 2011/0225565 | A1 | 9/2011 | Van Velzen et al. |

(Continued)

FOREIGN PATENT DOCUMENTS

| EP | 1217515 | 6/2002 |
|---|---|---|
| WO | WO2015017726 A1 | 2/2015 |

OTHER PUBLICATIONS

Van der Aalst, et al., "The Application of Petri Nets to Workflow Management", Journal of Circuits, Systems, and Computers, 1998 (Year: 1998).*

(Continued)

*Primary Examiner* — Robert A Cassity
*Assistant Examiner* — Tsu-Chang Lee
(74) *Attorney, Agent, or Firm* — Workman Nydegger (57) ABSTRACT

Executing a graph. A method includes identifying that a graph includes one or more nodes having input ports that are coupled to alternative inputs. The method further includes identifying permutations of inputs where each permutation uses one of the alternative inputs. The method further includes executing the graph for each of the identified permutations. The method further includes identifying a metric for each execution of the graph for each of the permutations. The method further includes providing a user with an indication of the metrics.

20 Claims, 3 Drawing Sheets

(56) References Cited

U.S. PATENT DOCUMENTS

| | | |
|---|---|---|
| 2011/0276915 A1 | 11/2011 | Freire et al. |
| 2012/0154373 A1 | 6/2012 | Finocchio |
| 2013/0117280 A1 | 5/2013 | Donaldson |
| 2013/0158964 A1 | 6/2013 | Hall et al. |
| 2013/0290980 A1 | 10/2013 | Kemp et al. |
| 2014/0067457 A1 | 3/2014 | Nagendra et al. |
| 2014/0170629 A1 | 6/2014 | Keim |
| 2014/0310208 A1 | 10/2014 | Fasel |

OTHER PUBLICATIONS

Gil et al., "Wings: Intelligent Workflow-Based Design of Computational Experiments", IEEE Intelligent Systems, 2011 (Year: 2011).*

2nd Written Opinion issued PCT Patent Application No. PCT/US2016/046093 dated Jul. 4, 2017.

Brownlee, Jason "BigML Review: Discover the Clever Features in this Machine Learning as a Service Platform" Published: Mar. 31, 2014, 11 pages.

Ericson, Gary "How to Evaluate Model Performance in Azure Machine Learning" Published Sep. 6, 2015, 14 pages.

Amerishi, Saleema, et al. "ModelTracker: Redesigning Performance Analysis Tools for Machine Learning" in Human Computer Interaction, Published: Apr. 18, 2015, 10 pages.

Ericson, Gary "Machine Learning Tutorial: Create Your First Experiment in Azure Machine Learning Studio" Available as early as Sep. 10, 2015, 13 pages.

"IBM Watson Analytics" Available at http://www.ibm.com/analytics/watson-analytics/ at least as early as Sep. 10, 2015, 4 pages.

Kajdanowicz, Tomasz, et al_ "Parallel Processing of Large Graphs" in Journal of Future Generation Computer Systems, vol. 32, Published: Mar. 1, 2014, 14 pages.

Ghoting, Amol, et al. "SystemML: Declarative Machine Learning on MapReduce" in 27th International Conference on Data Engineering, Published: Apr. 11, 2011, 12 pages.

"2nd WO issued in PCT Application No. PCT/US2016/065683," dated Oct. 10, 2017 (Copy Attached).

"International Preliminary Report on Patentability issued in PCT Application No. PCT/US2016/046093," dated Nov. 21, 2017 (Copy Attached).

"International Preliminary Report on Patentability Issued in PCT Application No. PCT/US2016/065683", dated Jan. 29, 2018, 6 Pages.

International Search Report and Written Opinion for PCT/US2016/046094 dated Oct. 17, 2016.

"Oozie", Published on: May 19, 2014Available at:https://oozie.apache.org/docs/4.0.0/WebServicesAPI.html.

Wassink, et al_, "Designing Workflows on the Fly Using e-BioFlow", In Proceedings of 7th International Joint Conference, ICSOC-Sevice Wave, Nov. 2009, pp. 470-484.

"Partial workflow reruns", Published on: May 6, 2009Available at:http://dev.mygrid.org.uk/wiki/display/minutes/2009-05-06+Partial+workflow+reruns.

"Freire, et al., ""VisTrails""", Published on: May 27, 2011Available at:http://www.aosabook.org/en/vistrails.html".

"CLARIN Workflows Architecture Explanation", Retrieved on: Jul. 25, 2015Available at:https://www.google.coo.in/url?sa=t&rct=j&q=&esrc=s&sou rce=web&cd=1&cad=rja&uact=8&ved=0CB4QFjAAahUKEwjdmluPpvPGAhUFHpQKHd2EALk&url=http%3A%2F%2Fweblicht.sfs.uni-tuebingen.de%2FWorkshopWebServices%2FCLARIN-WF-Requirements.doc&ei=XPCxVd36K4W8OATdiYLICw&usg=AFQjCNHBpCzUJiFMb3uQi1HSPO5J3V6BzQ&sig2=lzwmgFHF7z2jr-vaThawSA&bvm=bv.98476267,d.dGo.

Barthel, et al., "Visual programming of ImageJ using ImageFlow", In Proceedings of the ImageJ User and Developer Conference, Oct. 27, 2010, 5 pages.

"Holloway, et al., ""Chapter 8: Creating Custom Workflows for Windows SharePoint Services and Office SharePoint Server""", Published on: Dec. 17, 2010Available at:https://msdn.microsoft.com/en-us/library/dd535789(v=office.12).aspx".

Jaghoori, et aL, "User-Oriented Partial Result Evaluation in Workflow-based Science Gateways", In Proceedings of 9th Workshop on Workflows in Support of Large-Scale Science, Nov. 16, 2014, pp. 70-81.

Gil, Yolanda., "Workflow Composition: Semantic Representations for Flexible Automation", In Proceedings of Workflows for e-Science, Retrieved on: Jul. 25, 2015, pp. 1-15.

Laszewski, et al., "Grid Workflow—An Integrated Approach", In Technical Report, Retrieved on: Jul. 25, 2015, pp. 1-29.

Yu, et al., "Cost-based Scheduling of Scientific Workflow Applications on Utility Grids", In Proceedings of First International Conference on e-Science and Grid Computing, Jul. 2005, pp. 1-9.

International Search Report and Written Opinion for PCT/US2016/046093 dated Oct. 19, 2016.

International Search Report and the Written Opinion issued in PCT application No. PCT/US2016/065683 dated Mar. 15, 2017.

Chen Xianzhe: "A Comparison of Decision Tree and Logistic Regression Model", MWSUG 2009 Conference Proceedings, Oct. 13, 2009, pp. 1-10.

Mark Hall et al: "The WEKA data mining software", ACM SIGKDD Explorations Newsletter, association for Computing Machinery, Inc., US, vol. 11, No. 1, Nov. 16, 2009, pp. 10-18.

"Office Action Issued in European Patent Application No. 16820438.6", dated Oct. 14, 2019, 7 Pages.

"Summon to Attend Oral Proceedings Issued in European Patent Application No. 16820438.6", Mailed Date: Mar. 20, 2020, 6 Pages.

* cited by examiner

VARIATIONS IN EXPERIMENT GRAPHS FOR MACHINE LEARNING

BACKGROUND

Background and Relevant Art

Computers and computing systems have affected nearly every aspect of modern living. Computers are generally involved in work, recreation, healthcare, transportation, entertainment, household management, etc. High powered computing systems have enabled so-called machine learning. Machine learning includes computing systems receiving data input and performing various operations on the data input. Machine learning systems can learn from the data, and make predictions on the data. For example, machine learning can look for patterns in data and then exploit those patterns in future data. Thus, machine learning systems make data driven predictions rather than simply performing static program instructions on input data.

Machine learning systems are often implemented by using computational experiment graphs. For example, a graphical tool can be used to control the process from beginning to end. Using this tool, machine learning data scientists can apply data pre-processing nodes to raw data, run experiments on the prepared data using a machine learning algorithm, and test the resulting model. Once an effective model is found, systems can help its users deploy that model. One such tool is Azure Machine Learning (ML) available from Microsoft Corporation, of Redmond, Wash.

As one might imagine, a data scientist may wish to experiment with different pre-processing nodes, different experiment nodes, and/or different test nodes. Alternatively or additionally, a data scientist may wish to experiment with different input into a given node. Thus, for each different node and/or dataset that a data scientist wishes to experiment with, a new graph will to be created with that variation.

Managing different variations of machine learning computational graph is rather difficult. Currently, if a user wishes to experiment on a variation of a graph, the user will copy that graph to a new graph, make a change to the graph to implement the desired variation and do bookkeeping for the various versions of the graph him or herself.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment. The method includes acts for executing a graph. The method includes identifying that a graph includes one or more nodes having input ports that are coupled to alternative inputs. The method further includes identifying permutations of inputs where each permutation uses one of the alternative inputs. The method further includes executing the graph for each of the identified permutations. The method further includes identifying a metric for each execution of the graph for each of the permutations. The method further includes providing a user with an indication of the metrics.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments described herein allow users to manage different variations of an experiment in one graph. In particular, a graph can be created with various alternative variations in the single graph. For example, a node that is designed with an input port that is traditionally used for a single input could be implemented with a multiple-input port that is able to be connected to multiple different alternative inputs and/or multiple alternative different upstream nodes. A user could execute (i.e., "run") such a graph which will cause the system to automatically construct and execute separate graphs for each combination of variations. Thus, in the example where multiple input signals (i.e., inputs) are connected to a multiple-input port, the system will automatically run an experiment for each of the different permutations of inputs into each of the different nodes.

Further, the system can manage the different variations. The system can report on the results of the different variations to a user and allow the user to select a particular variation for implementation based on the results of the different variations. In this way, a user could extract evaluation values important for choosing desired variations, select a desired variation, and deploy the desired variation to a service in a single user interface (UI), without needing to review results in different variant copies of the graph.

Figure 1:
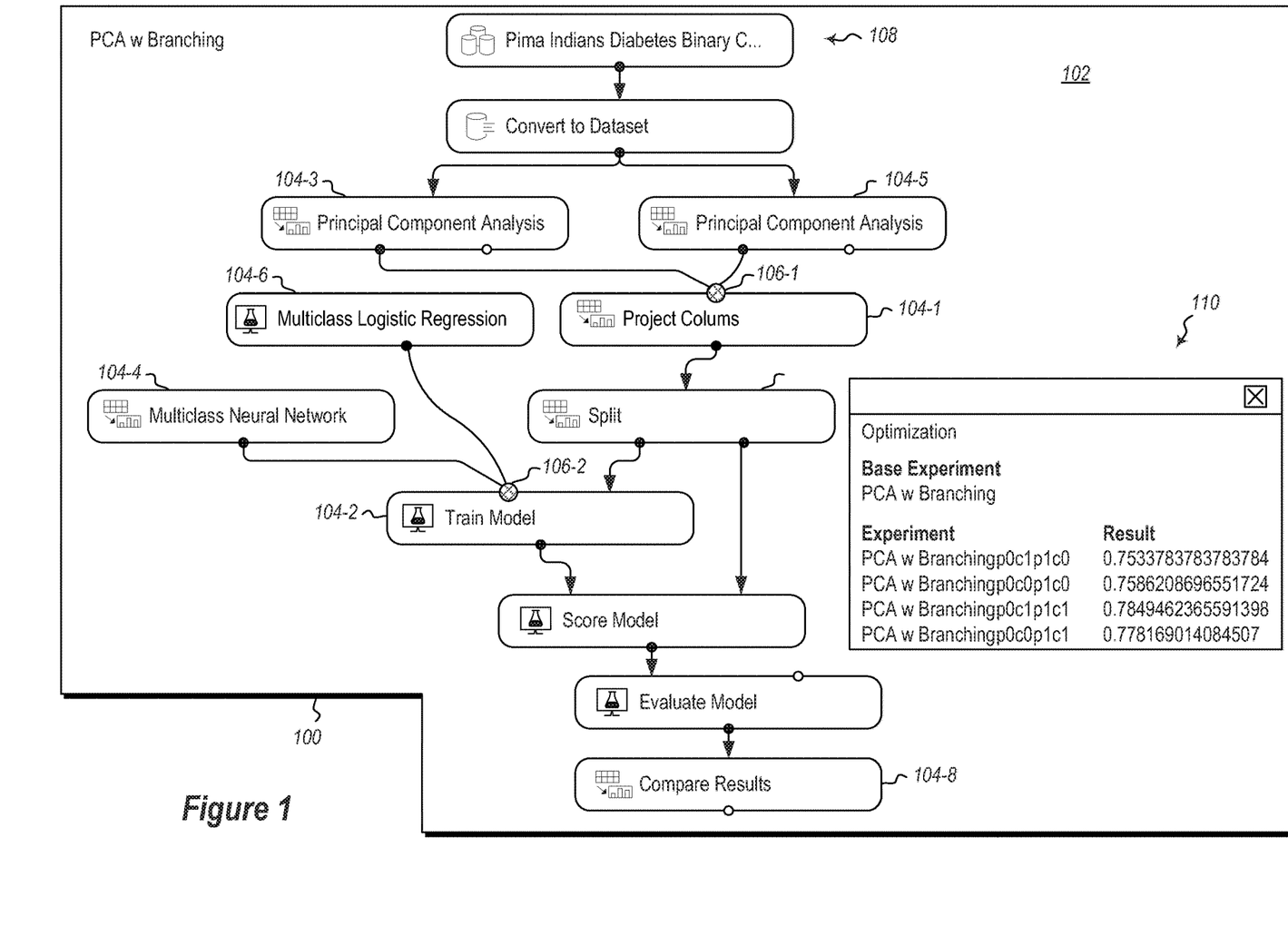
FIG. 1 illustrates a user interface allowing a user to connect multiple inputs to an input port of a graphical node.

Referring now to FIG. 1, an example is illustrated. FIG. 1 illustrates a user interface 100. As will be illustrated in more detail below, and with reference to FIG. 2, the user interface 100 may be displayed to a user by a machine learning system 200. The user interface 100 includes an experiment canvas 102. A user can place various nodes (sometimes referred to as 'nodes' or 'graph nodes') on the experiment canvas and connect the nodes by edges. In particular, nodes may have one or more input ports and one or more output elements. In a typical graph, each input port is only able to be connected to a single edge. However, embodiments described herein implement input ports that can be connected to multiple inputs (see e.g., node 104-1 and input port 106-1 and node 104-2 and input port 106-2).

Note that this may be selectable. For example, a user may be able to indicate in a control that they wish for multiple inputs to be able to be connected to a given input port. Thus, for example, a user may be able to right-click the input port 106-1 which would cause selectable properties to be displayed. The user could select a property indicating that the input port 106-1 should be allowed to have multiple inputs connected to it. Alternatively, embodiments may allow a user to specify that all input ports are capable of receiving multiple inputs. Alternatively, embodiments may be implemented where users can simply connect multiple inputs to input ports without any specialized user selectable setting. In some embodiments, when a user attempts to connect multiple input to an input port, the system 200 will cause the user interface 100 to display a message indicating that the user is connecting multiple inputs to a single input port. In some such embodiments, the user may be asked to confirm that this is their intention and that they intend for different permutations of a graph to be run.

In some embodiments where the ability to allow multiple inputs to an input port is selectable by a user, the user interface 100 will not allow multiple inputs to be connected to an input port unless an appropriate setting is set. Alternatively, if the setting is not set, an error may be generated to identify to a user that multiple inputs have been connected to a single input port. If the setting is set for the input port (or for all input ports), then the user is permitted to connect multiple inputs to the single input port.

In some embodiments, node input ports that are configured to accept multiple inputs, and/or that have multiple inputs connected to them, could have different visual characteristics. For example, such an input port could be of a different color or shade than other input ports. Alternatively, such input ports could have a specialized shape that differs from other input ports. Alternatively or additionally, such input ports could have multiple connection points shown. Etc.

Once a user has laid out a graph on the canvas 102, including nodes having input ports coupled to multiple inputs, such as the graph 108 illustrated in FIG. 1, a user can cause the graph to be executed. For example, the user interface 100 may include graph execution elements that allows the graph 108 to be executed. When a user selects a graph execution element, the system 200 will automatically identify the various permutations of the graph that may exist. In particular, in some embodiments, a given permutation reduces the graph such that each input port has only a single input coupled to it for the given permutation. Thus, for example, as illustrated in FIG. 1, there are four possible permutations: a first permutation where node 104-3 provides input data to the node 104-1 and the node 104-4 provides input data to the node 104-2; a second permutation where node 104-3 provides input data to the node 104-1 and the node 104-6 provides input data to the node 104-2; a third permutation where node 104-5 provides input data to the node 104-1 and the node 104-4 provides input data to the node 104-2; and a fourth permutation where node 104-5 provides input data to the node 104-1 and the node 104-6 provides input data to the node 104-2.

Note that the different permutations may be useful for executing experiment graphs with different nodes providing different input. In the illustrated example shown in FIG. 1, this takes one of two different forms. The first form is when two copies of the same node are used to provide input, but where the two copies each have different operating parameters. For example, FIG. 1 illustrates the nodes 104-3 and 104-5 are both principal component analysis nodes. However, in this example, the node 104-3 may use five coefficients while the node 104-5 may use seven coefficients. Thus, different permutations of the graph 108 will be executed where the project columns node 104-1 receives input from a principle component analysis using five coefficients in some permutations and receives input from a principle component analysis using seven coefficients in other permutations. Thus, in this example, the nodes represent the same analysis tool, but with different parameters.

The second form is when different nodes using different types of operations are used. For example, FIG. 1 illustrates that both a multiclass neural network node 104-4 and a multiclass logical regression node 104-6 provide inputs to the input port 106-2 for the train model node 104-2. Thus, different permutations of the graph 108 that are executed due to these two different nodes (i.e., nodes 104-4 and 104-6) will be executed with different analysis tools.

For each execution of the graph (one for each permutation), one or more metrics are obtained. For example, such metrics may be related to accuracy, efficiency, precision, time etc. For example, metrics may be obtained for each permutation that allow a user to compare how accurate that permutation is compared to other permutations. Metrics may be obtained for each permutation that allow a user to compare how efficiently one permutation operates in comparison to other permutations. Metrics may be obtained for each permutation that allow a user to compare how precise (e.g., how many significant figures a permutation has) one permutation is in comparison to other permutations. Metrics may be obtained for each permutation that allow a user to compare how quickly one permutation operates (assuming the same or similar computing hardware or compensating for differences in computing hardware) comparison to other permutations.

The system is configured to display on the user interface 100 a summary of the obtained metrics from the executions of the graph. For example, FIG. 1 illustrates a table 110 displayed in the user interface 100. The table 110 includes an entry for each of the permutations, where each permutation entry includes a metric to be compared. In this way, a user can quickly compare the various permutations.

Thus, as illustrated, a user defines variations of a machine learning experiment graph in one base graph using a tool and the tool executes the different variations as independent graphs either serially or in parallel. The key evaluation results of each variation are presented in one dialog for comparison and ease of selecting the best variation.

Thus, embodiments allow multiple connections to the input port of a node or node of an experiment graph. Each connection to the same input port defines a variation to the base experiment, since input ports can only run with a single connection at a time. When executing a base experiment, a new experiment is created for each variation. In some embodiments, a new experiment is created by removing all but one connection from each input port with more than one connection. A new experiment is created by the system for of the combinations of inputs across all nodes with more than one input port connection.

Figure 2:
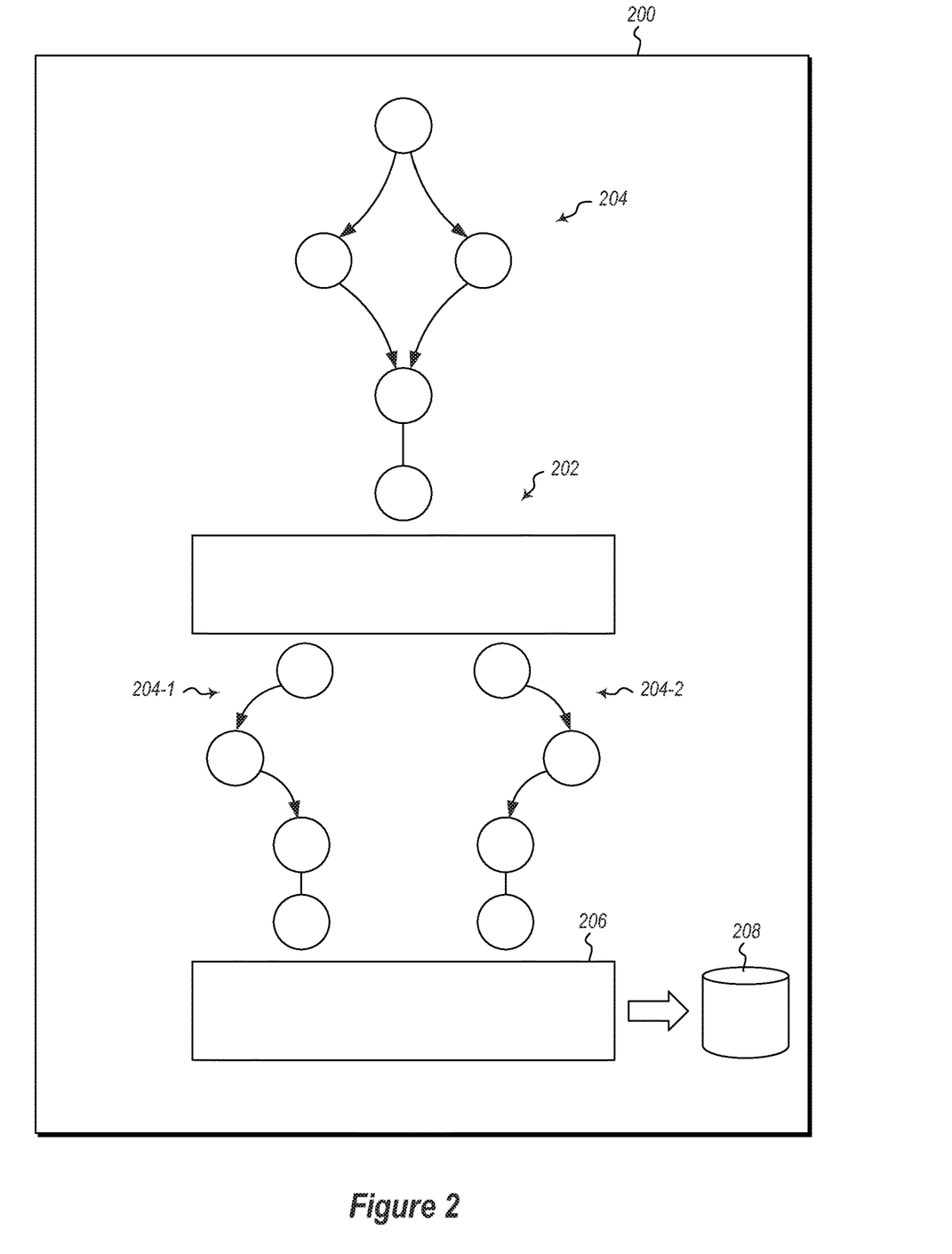
FIG. 2 illustrates a system for creating and running graphs.

Each experiment variation from the base experiment can be executed independently or in parallel. In some embodiments a special comparison node is added to the base experiment to extract evaluation result from each executed variation at a specific point in the experiment. The special comparison node is able to persist data across the different permutations of the experiment. Alternatively, the system 200 may include functionality for instrumenting an experiment without adding additional nodes to the experiment.

The results from a comparison (whether obtained from the comparison node or otherwise) are presented to the user in one user interface element, such as a table 110 as illustrated in FIG. 1, that contains each variation result. From this user interface element, a user can see the various results and select a desired experiment variation. For example, a user can select a desired experiment from the various experiments illustrated in the table 110. In some embodiments, selecting an experiment will cause the user interface 100 to display and/or enable user interface elements that allow the user to deploy the experiment in a production environment. In particular, the experiment will be configured to collect and analyze data using the selected permutation experiment.

Referring now to FIG. 2, a machine learning system 200 is illustrated. The machine learning system 200 includes a permutator 202. The permutator 202 is configured to take a graph 204 having alternative inputs to an input port and to permute the graph 202 into various permutations (illustrated at 204-1 and 204-2) as described above. The permutations are then provided to an execution engine 206 that is configured to execute the individual permutations. These could be executed in serial, parallel, or some combination. Various metrics may be generated. In some embodiments, these are generated and collected by one or more nodes in the graph 204 itself. In other embodiments, an external tool 208 may collect metrics from the execution engine 206. These metrics can then be displayed to a user, such as in the examples illustrated above.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
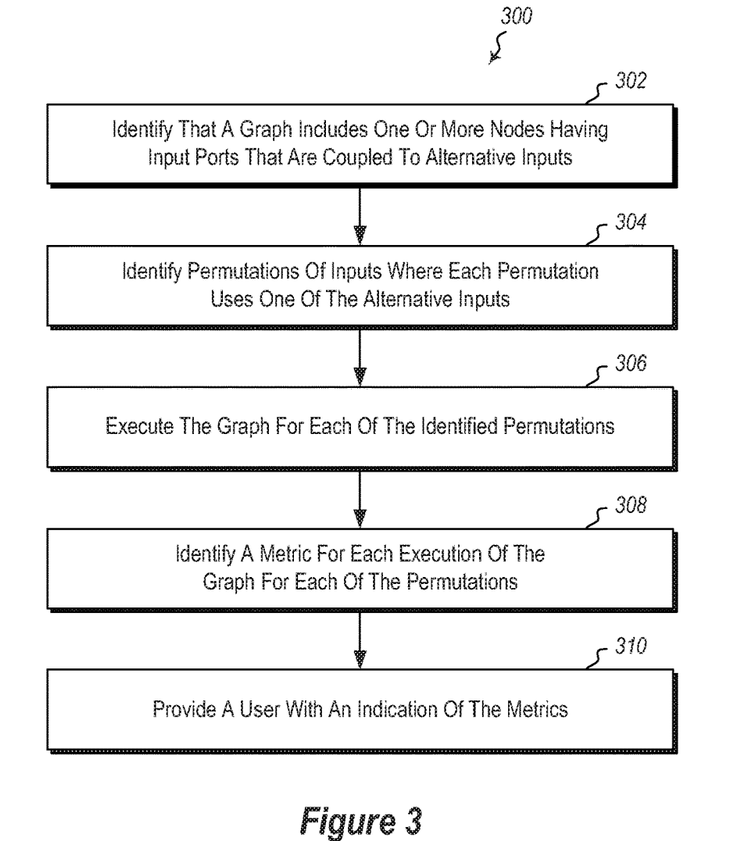
FIG. 3 illustrates a method of executing a graph.

Referring now to FIG. 3, a method 300 is illustrated. The method 300 may be practiced in a computing environment and includes acts for executing a graph. The method includes identifying that a graph includes one or more nodes having input ports that are coupled to alternative inputs (act 302). For example, as illustrated in FIG. 1, embodiments can identify that node 104-1 has an input port 106-1 coupled to multiple inputs.

The method 300 further includes identifying permutations of inputs where each permutation uses one of the alternative inputs (act 304). For example, as illustrated above, in FIG. 1, there are four possible permutations: a first permutation where node 104-3 provides input data to the node 104-1 and the node 104-4 provides input data to the node 104-2; a second permutation where node 104-3 provides input data to the node 104-1 and the node 104-6 provides input data to the node 104-2; a third permutation where node 104-5 provides input data to the node 104-1 and the node 104-4 provides input data to the node 104-2; and a fourth permutation where node 104-5 provides input data to the node 104-1 and the node 104-6 provides input data to the node 104-2.

The method 300 further includes executing the graph for each of the identified permutations (act 306).

The method 300 further includes identifying a metric for each execution of the graph for each of the permutations (act 308).

The method 300 further includes providing a user with an indication of the metrics (act 310). For example, as illustrated in FIG. 1, a user is provided with the table 110 showing various metrics.

The method 300 may be practiced where the graph is executed in parallel for each of the permutations.

The method 300 may further include receiving user input selecting one of the permutations and automatically creating a new graph with an input corresponding to the selected permutation while excluding inputs corresponding to other permutations. For example, a user may select one of the experiments shown in the table 110 by selecting a line in the table. This would case a new graph to be created for just the selected permutation.

The method 300 may further include receiving user input selecting one of the permutations and automatically deploying the selected permutation to a data analysis service.

The method 300 may further include alerting a user that an input port of a node that would normally have a single input connected to it has a plurality of inputs connected to it, and prompting the user to confirm that the users wishes for different permutations of the graph to be executed using the different inputs.

The method 300 may be practiced where the alternative inputs comprise a plurality of nodes connected to a single input port of a target node. For example, in FIG. 1, nodes 104-3 and 104-5 are connected to the input port 106-1. In some such embodiments, the plurality of nodes may include two or more copies of the same node, but each copy having different operating parameters. For example, nodes 104-3 and 104-5 are both principle component analysis nodes, but may each use different numbers of coefficients. Alternatively, the plurality of nodes comprises different nodes using different types of operations. Thus for example, node 104-4 is a multiclass neural network having one type of operations and node 104-6 is a multiclass logical regression node having a different type of operations.

The method 300 may be practiced where the graph comprises one or more comparison nodes configured to collect metrics from each executed permutation and wherein identifying a metric for each execution of the graph for each of the permutations is performed using the comparison node. For example, FIG. 1 illustrates a compare node 104-8 used to create the table 110.

The method 300 may be practiced where a tool running external to the graph is configured to collect metrics from each executed permutation and wherein identifying a metric for each execution of the graph for each of the permutations is performed using the tool.

Figure 4:
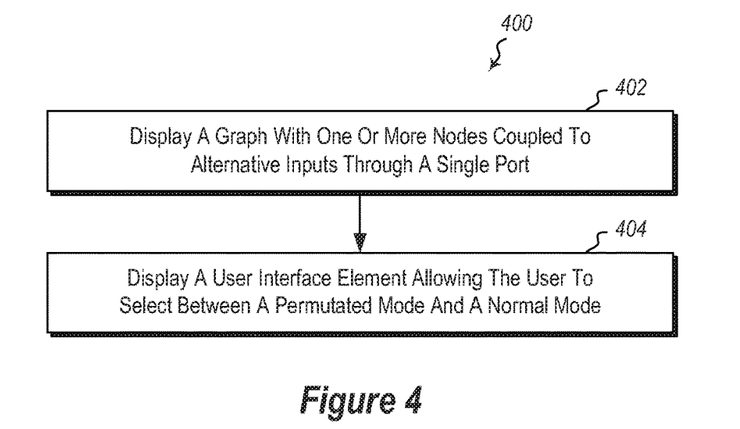
FIG. 4 illustrates a method of providing interaction with a graph.

Referring now to FIG. 4, a method 400 is illustrated. The method 400 may be practiced in a computing environment. The method 400 includes acts for providing interaction with a graph. The method includes displaying a graph with one or more nodes coupled to alternative inputs through a single port (act 402). As illustrated above, the graph 108 is displayed with nodes, such as node 104-1 connected to multiple alternative inputs.

The method 400 further includes displaying a user interface element allowing the user to select between a permutated mode and a normal mode (act 404). For example, a user could select a user setting or other configuration setting to select the mode.

The method 400 may further include, receiving user input selecting permutated mode. As a result, the method includes allowing multiple inputs to be connected to a single input port of a target node.

Alternatively or additionally, the method 400 may further include, receiving user input selecting normal mode, and as a result, preventing multiple inputs from being coupled to a single input interface of a target node.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media, Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or nodes and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface node (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program nodes may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs) etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for executing a machine learning experiment graph, the system comprising:
  one or more processors; and
  one or more computer-readable media having stored thereon instructions that are executable by the one or more processors to configure the computer system to execute a machine learning experiment graph, including instructions that are executable to configure the computer system to perform at least the following:
    receiving user input selecting a permutated mode at a graphical user interface, and while in the permutated mode:
      receiving user input at the graphical user interface constructing a single machine learning experiment graph, representing a plurality of different independent variations of the machine learning experiment graph by including at least one node having an input port that represents an input port for a single input in a given independent variation, but that is coupled to alternative inputs in the machine learning experiment graph;

identifying different permutations of inputs into the input port coupled to the alternative inputs by identifying, for each permutation a single input of the alternative inputs coupled to the input port, such that each different permutation represents a different variation of the machine learning experiment graph with the input port being coupled to a single input;

executing each of the different variations of the machine learning experiment graph for each of the identified permutations by automatically creating a new, separate, machine learning experiment graph for each given different variation, by excluding other alternative inputs not included in the given different permutation;

identifying a metric for each execution of the different variations of the machine learning experiment graph for each of the permutations; and providing a user with an indication of the metrics comparing the different permutations in the graphical user interface; and receiving user input selecting a normal mode, and while in the normal mode:

preventing multiple inputs from being coupled to a single input port of a target node.

2. The system of claim 1, wherein different variations of the machine learning experiment graph are executed in parallel for each of the permutations.

3. The system of claim 1, wherein the alternative inputs comprise a plurality of nodes connected to the input port of the at least one node.

4. The system of claim 3, wherein the plurality of nodes comprises two or more copies of the same node, but each copy having different operating parameters.

5. The system of claim 3, wherein the plurality of nodes comprises different nodes using different types of operations.

6. The system of claim 1, wherein the machine learning experiment graph comprises one or more comparison nodes configured to collect metrics from each executed variation and wherein identifying a metric for each execution of the different variations of the machine learning experiment graph for each of the permutations is performed using the comparison node.

7. The system of claim 1, further comprising a tool running external to the machine learning experiment graph that is configured to collect metrics from each executed variations and wherein identifying a metric for each execution of the different variations of the machine learning experiment graph for each of the permutations is performed using the tool.

8. In a computing environment, a method of executing a machine learning experiment graph, the method comprising:

receiving user input selecting a permutated mode at a graphical user interface, wherein the permuted mode is selected from between a normal mode and the permuted mode, wherein selecting the normal mode configures the computing environment to prevent multiple inputs from being coupled to a single input port of a target node, the method further comprising while in the permuted mode:

receiving user input at the graphical user interface constructing a single machine learning experiment graph, representing a plurality of different independent variations of the machine learning experiment graph by including at least one node having an input port that represents an input port for a single input in a given independent variation, but that is coupled to alternative inputs in the machine learning experiment graph;

identifying different permutations of inputs into the input port coupled to the alternative inputs by identifying, for each permutation a single input of the alternative inputs coupled to the input port, such that each different permutation represents a different variation of the machine learning experiment graph with the input port being coupled to a single input;

executing each of the different variations of the machine learning experiment graph for each of the identified permutations by automatically creating a new, separate, machine learning experiment graph for each given different variation, by excluding other alternative inputs not included in the given different permutation;

identifying a metric for each execution of the different variations of the machine learning experiment graph for each of the permutations; and providing a user with an indication of the metrics comparing the different permutations in the graphical user interface.

9. The method of claim 8, wherein the different variations of the machine learning experiment graph are executed in parallel for each of the permutations.

10. The method of claim 8, further comprising receiving user input selecting one of the permutations and automatically creating a new machine learning experiment graph with an input corresponding to the selected permutation while excluding inputs corresponding to other permutations.

11. The method of claim 8, further comprising receiving user input selecting one of the permutations and automatically deploying a corresponding variation of the machine learning experiment graph to a data analysis service.

12. The method of claim 8, further comprising, alerting a user that an input port of a node that would normally have a single input connected to it has a plurality of inputs connected to it, and prompting the user to confirm that the users wishes for different variations of the machine learning experiment graph to be executed using permutations the different inputs.

13. The method of claim 8, wherein the alternative inputs comprise a plurality of nodes connected to the port of the at least one node.

14. The method of claim 13, wherein the plurality of nodes comprises two or more copies of the same node, but each copy having different operating parameters.

15. The method of claim 13, wherein the plurality of nodes comprises different nodes using different types of operations.

16. The method of claim 8, wherein the machine learning experiment graph comprises one or more comparison nodes configured to collect metrics from each executed variation and wherein identifying a metric for each execution of the different variations of the machine learning experiment graph for each of the permutations is performed using the comparison node.

17. The method of claim 8, wherein a tool running external to the machine learning experiment graph is configured to collect metrics from each executed variation and wherein identifying a metric for each execution of the different variations of the machine learning experiment graph for each of the permutations is performed using the tool.

18. A physical computer readable storage device having stored thereon instructions that when executed by one or more processors to configure a computer system to execute a machine learning experiment graph, including instructions that are executable to configure the computer system to perform at least the following:

receiving user input selecting a permutated mode at a graphical user interface, and while in the permutated mode:

receiving user input at the graphical user interface constructing a single machine learning experiment graph, representing a plurality of different independent variations of the machine learning experiment graph by including at least one node having an input port that represents an input port for a single input in a given independent variation, but that is coupled to alternative inputs in the machine learning experiment graph;

identifying different permutations of inputs into the input port coupled to alternative inputs by identifying, for each permutation a single input of the alternative inputs coupled to the input port, such that each different permutation represents a different variation of the machine learning experiment graph with the input port being coupled to a single input;

executing each of the different variations of the machine learning experiment graph for each of the identified permutations by automatically creating a new, separate, machine learning experiment graph for each given different variation, by excluding other alternative inputs not included in the given different permutation;

identifying a metric for each execution of the different variations of the machine learning experiment graph for each of the permutations; and         providing a user with an indication of the metrics comparing the different permutations in the graphical user interface; and     receiving user input selecting a normal mode, and while in the normal mode:

preventing multiple inputs from being coupled to a single input port of a target node.

19. The physical computer readable storage device of claim 18, wherein the machine learning experiment graph is executed in parallel for the different variations of the machine learning experiment graph.

20. The physical computer readable storage device of claim 18, wherein the alternative inputs comprise a plurality of nodes connected the input port of the at least one node.

\* \* \* \* \*